United States Patent
Toncelli

(10) Patent No.: US 9,346,618 B2
(45) Date of Patent: May 24, 2016

(54) DISPLACEABLE LIFT TRUCK EQUIPPED WITH RELEASABLE ENGAGING MEANS FOR MAKING UP A MIXED PACK OF SLAB MATERIAL AND METHOD ASSOCIATED THEREWITH

(76) Inventor: Luca Toncelli, Bassano del Grappa (IT)

( * ) Notice: Subject to any disclaimer, the term of this patent is extended or adjusted under 35 U.S.C. 154(b) by 808 days.

(21) Appl. No.: 12/988,095

(22) PCT Filed: Apr. 7, 2009

(86) PCT No.: PCT/IB2009/051452
§ 371 (c)(1),
(2), (4) Date: Oct. 15, 2010

(87) PCT Pub. No.: WO2009/127994
PCT Pub. Date: Oct. 22, 2009

(65) Prior Publication Data
US 2011/0033270 A1 Feb. 10, 2011

(30) Foreign Application Priority Data
Apr. 18, 2008 (IT) .............................. TV2008A0063

(51) Int. Cl.
B65G 1/04 (2006.01)
B66F 9/07 (2006.01)
B66F 9/14 (2006.01)
B65G 59/04 (2006.01)

(52) U.S. Cl.
CPC ............ *B65G 1/0407* (2013.01); *B65G 1/0435* (2013.01); *B65G 59/04* (2013.01); *B66F 9/07* (2013.01); *B66F 9/146* (2013.01)

(58) Field of Classification Search
CPC ...... B65G 1/0435; B65G 59/04; B66F 9/141; B66F 9/146
USPC ................................... 414/277, 331.1, 331.18
See application file for complete search history.

(56) References Cited

U.S. PATENT DOCUMENTS

| 4,735,539 | A | * | 4/1988 | Hakkinen et al. | 414/281 |
| 4,887,351 | A | | 12/1989 | Porterfield | |
| 4,911,608 | A | * | 3/1990 | Krappitz et al. | 414/796 |
| 5,120,178 | A | * | 6/1992 | Ito | B21D 43/20 414/222.07 |
| 5,630,692 | A | * | 5/1997 | Hanaya | 414/277 |
| 5,749,693 | A | * | 5/1998 | Hanaya | 414/277 |

FOREIGN PATENT DOCUMENTS

| EP | 0527331 A | 2/1993 |
| EP | 0683131 A | 11/1995 |
| GB | 966329 A | 8/1964 |

(Continued)

OTHER PUBLICATIONS

"PCT International Search Report dated Jul. 7, 2009 for PCT/IB2009/051452, from which the instant application is based," 3 pgs.

(Continued)

*Primary Examiner* — James Keenan
(74) *Attorney, Agent, or Firm* — Fredrikson & Byron, P.A.

(57) ABSTRACT

Displaceable lift truck for handling slab material (L) in a storage warehouse, including a carriage movable along a rail, columns which extend upwards from the movable carriage and a material support structure movable along the columns and including a bottom body or platform provided with extractable forks. The material support structure includes, moreover, a pick-up device including extractable arms. Further related, there is a method for making up a mixed pack of slab material.

15 Claims, 4 Drawing Sheets

(56) References Cited

FOREIGN PATENT DOCUMENTS

| | | | |
|---|---|---|---|
| GB | 2205300 | A | 12/1988 |
| JP | 2002211707 | A | 7/2002 |
| JP | 2006124112 | A | 5/2006 |

OTHER PUBLICATIONS

"PCT International Preliminary Report on Patentability dated Jul. 23, 2010 for PCT/IB2009/051452, from which the instant application is based," 9 pgs.

* cited by examiner

DISPLACEABLE LIFT TRUCK EQUIPPED WITH RELEASABLE ENGAGING MEANS FOR MAKING UP A MIXED PACK OF SLAB MATERIAL AND METHOD ASSOCIATED THEREWITH

RELATED APPLICATIONS

This application is a 35 U.S.C. 371 national stage filing from International Application No. PCT/IB2009/051452 filed Apr. 7, 2009 and claims priority to Italian Application No. TV2008A000063 filed Apr. 18, 2008, the teachings of which are incorporated herein by reference.

TECHNICAL FIELD OF THE INVENTION

The present invention concerns generally the sector relating to systems for handling material inside a storage warehouse, in particular a displaceable lift truck for making up mixed packs of slab material, for example natural or agglomerated stone slabs or ceramic slabs. The invention concerns, moreover, a method for making up a mixed pack of slab material performed using said displaceable lift truck.

STATE OF THE ART PRIOR TO THE INVENTION

As is known, in a plant for shaping and machining, for example polishing, stone material, the slabs which are obtained are typically stored in packs arranged inside a store in a vertical or horizontal position. The store with the horizontally arranged packs is normally formed by a shelving system composed of a series of shelving with several shelves and intermediate passageways inside each of which a displaceable lift truck with telescopic forks on either side moves.

Packs, which are typically formed by 10 to 15 homogeneous slabs, namely slabs made of the same material and with the same thickness, are arranged on the displaceable lift truck and, when the truck reaches the point where the slabs are to be deposited, the telescopic forks are extracted and the pack containing the slabs is deposited on the pre-chosen shelf of a shelving.

Owing to the arrangement of the forks on either side, the slabs may be positioned equally well on shelves arranged on one side or on the opposite side of the passageway. In the particular case of fragile slabs, in order to protect them from damage, a layer of material able to dampen impacts, for example a wooden panel, is positioned underneath the pack.

If a client orders a certain number of slabs of different kinds, these slabs must be removed from the store and packaged inside a so-called mixed pack which, finally, is loaded onto a vehicle, for example an articulated lorry.

Depending on the type of slabs ordered, the displaceable lift truck therefore removes the corresponding packs of homogeneous slabs from the store and deposits them in a specific area situated outside of the shelving, at the front or the rear, known as a picking area.

This area is equipped with handling systems which perform the picking operation, namely remove from each pack the desired number of slabs and stack them so as to make up a mixed pack ready to be loaded into a container or onto an articulated lorry. Once the picking operation has been completed, the displaceable lift truck removes the homogeneous packs with the remaining slabs and deposits them again inside the store.

The above description clearly demonstrates that preparation of an order may constitute a long and complex operation. It is in fact required to remove from the store the packs containing the slabs ordered, perform the picking operation in order to make up the mixed pack to be despatched to the client and, finally, reposition the packs with the remaining slabs on the corresponding store shelves.

Moreover, a dedicated picking area, equipped with suitable removal and stacking devices, must be provided. This results in the need to provide sufficiently spacious areas as well as particularly complex equipment, with a consequent increase in the investment, maintenance and management costs.

The main object of the present invention is to solve the above-mentioned technical problems by providing a displaceable lift truck provided with a pick-up device able to remove a slab one at a time and stack the slabs of the desired number and type, removing them directly from the shelves, i.e. directly inside the slab storage warehouse, so as to make up a mixed pack.

Another object of the present invention is to provide a method for making up a mixed pack of slab material consisting of at least two different types, performed using a displaceable lift truck provided with a pick-up device of the above-mentioned type.

This, object, together with others, which will appear more clearly below, is achieved by a displaceable lift truck according to Claim 1 and by a method according to Claim 8.

Further advantageous features of the invention are described in the dependent claims.

The technical solution proposed offers significant advantages compared to the solutions known in the present state of the art.

Firstly, it shortens and simplifies the procedure, and therefore the time needed, for preparation of an order, since the step of transporting homogeneous packs of slabs from the store to the picking area, and vice versa, is eliminated. Moreover, it is no longer required to provide a dedicated picking area, with the corresponding slab handling devices, resulting in savings in terms of space and costs.

Last but not least, an advantageous feature is that of reduced wear of the displaceable lift truck, which is used less, as well as a smaller amount of energy needed for operation thereof.

DETAILED DESCRIPTION OF THE DRAWINGS

Characteristic features and advantages of the present invention will emerge more clearly from the following detailed description of a currently preferred example of embodiment thereof, provided solely by way of a non-limiting example, with reference to the accompanying drawings, in which.

and FIGS. 4a to 4f are front views of the sequence of stages in an operation for removing and stacking a slab in order to make up a mixed pack.

In the accompanying drawings, identical or similar parts have been indicated by the same reference numbers.

DETAILED DESCRIPTION OF THE INVENTION

Figure 1:
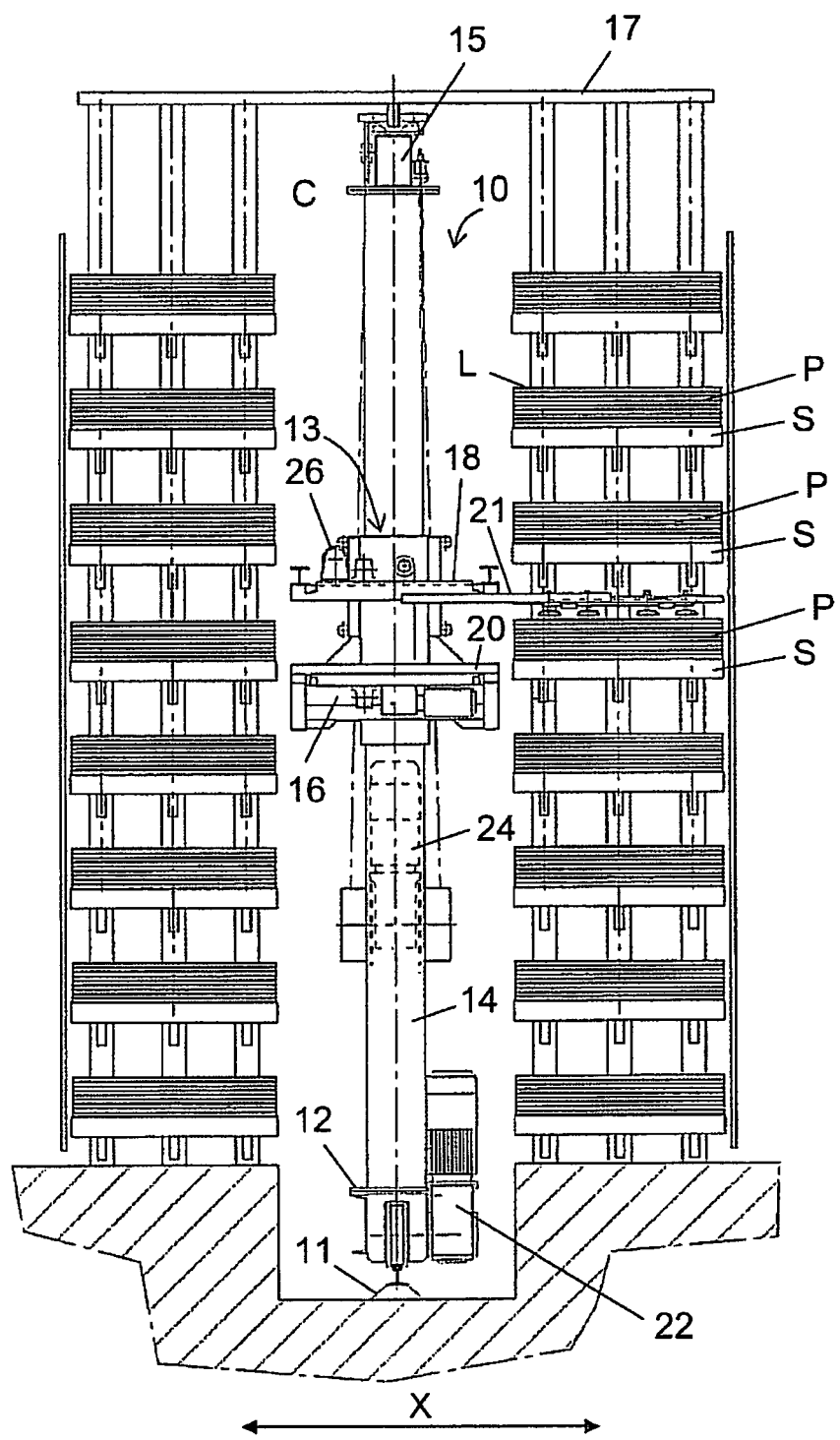
FIG. 1 is a front view of a displaceable lift truck according to the invention during removal of a slab from a homogeneous pack of slabs positioned on a shelf of a shelving in a storage warehouse.
Figure 2:
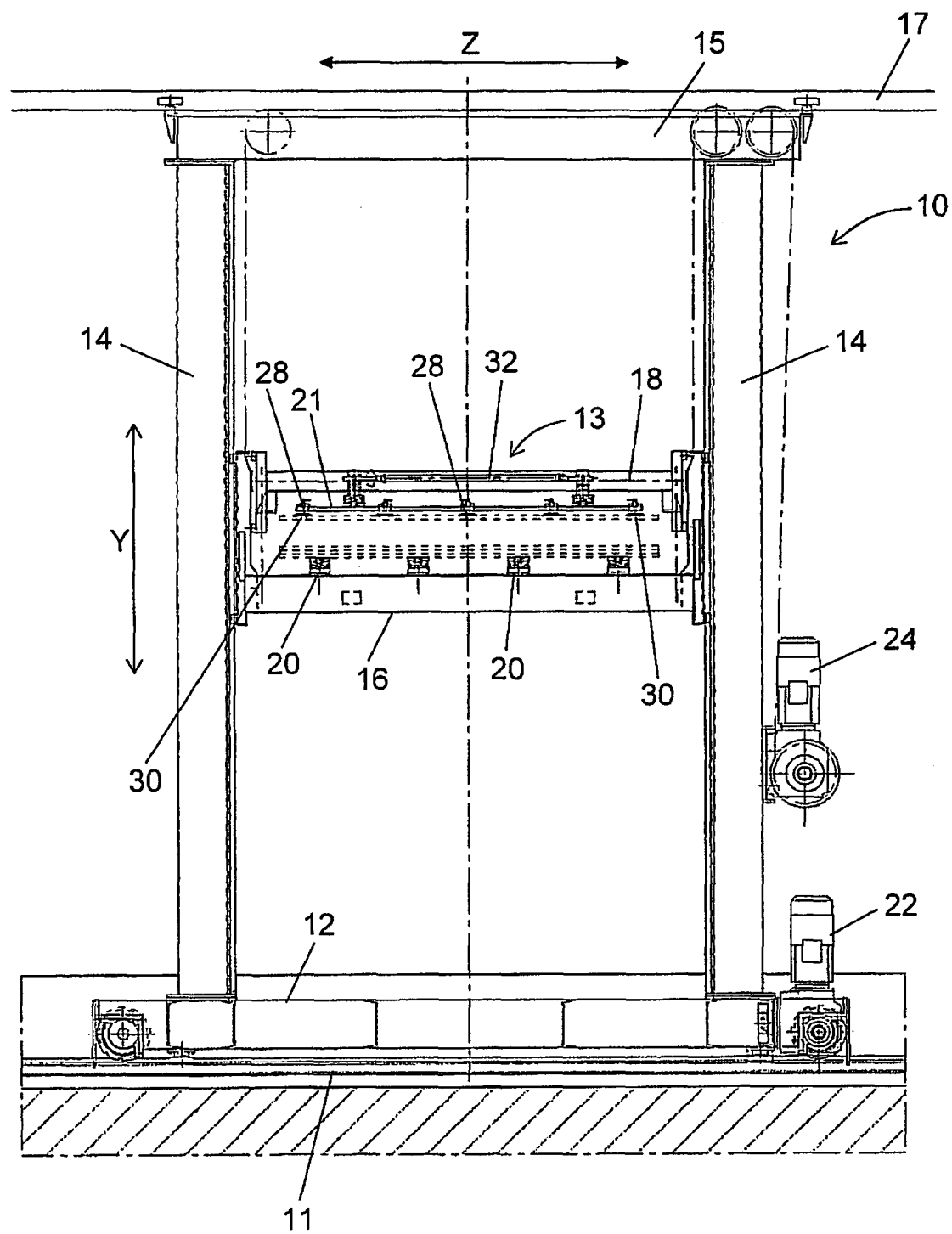
FIG. 2 is a side view of the displaceable lift truck according to FIG. 1 during stacking of a removed slab.
Figure 3:
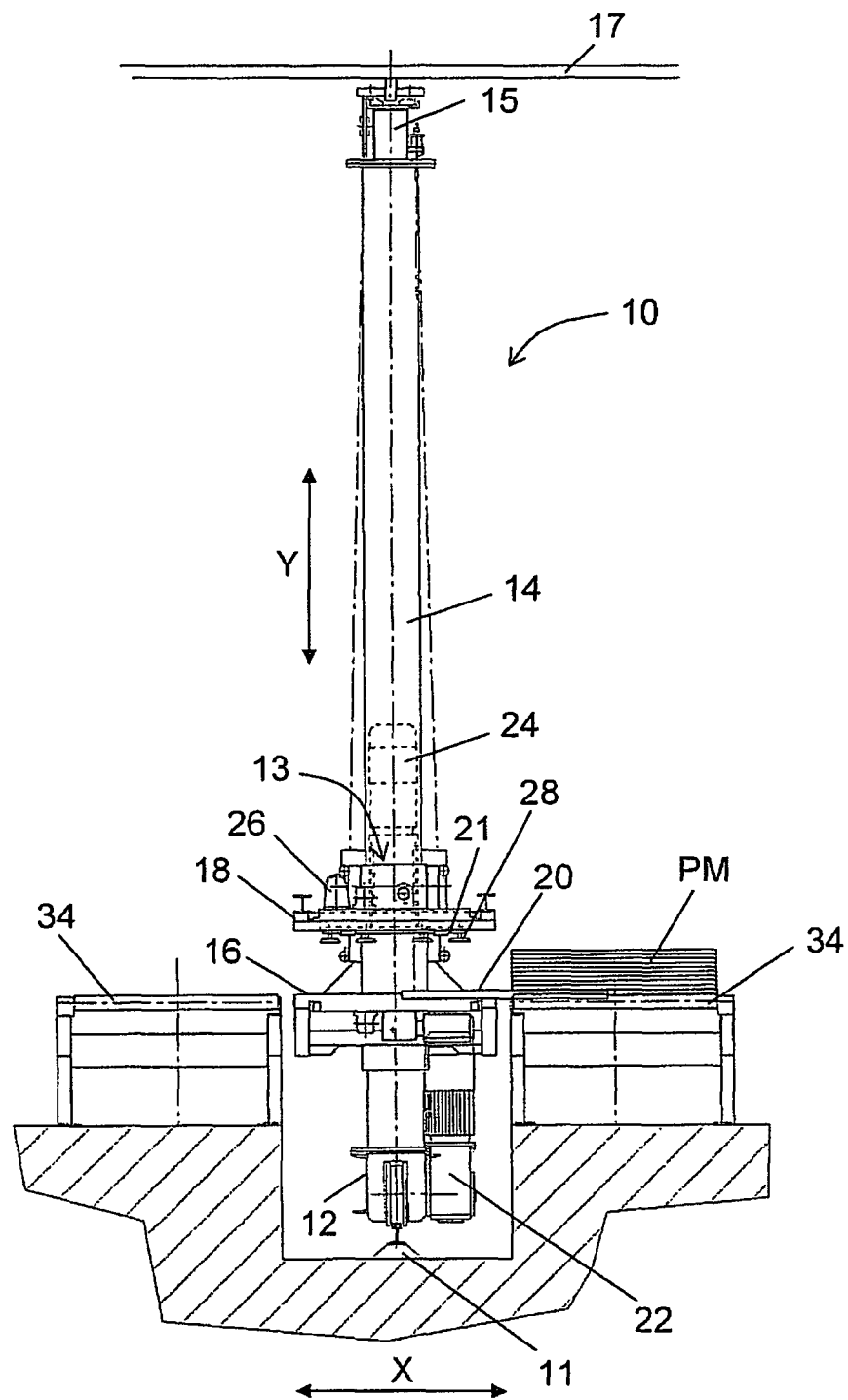
FIG. 3 is a front view of the displaceable lift truck according to FIGS. 1 and 2 during loading of a stack of mixed slabs on roller-type conveyor means.

With reference to FIGS. 1 to 3, a displaceable lift truck according to the invention, denoted overall by the reference number 10, is formed by a motor-driven carriage 12 movable along the passageways C in a storage warehouse and slidable along a bottom rail 11 associated with each passageway C in a direction indicated commonly as the axis Z.

Two columns 14, connected together by a cross-piece 15 at the top end and fastened to an upper rail 17, extend upwards from the carriage 12, a slab support structure 13 being movable vertically upwards and downwards in a direction commonly indicated as the axis Y along said columns. The slab support structure 13 comprises a bottom body or platform 16, provided with telescopic forks 20 which are movable in a direction indicated commonly as the axis X, and a top body or pick-up device 18. The pick-up device 18 is movable towards and away from the platform 16 and comprises at least one extractable arm 21 provided with releasable engaging means, also movable along the direction indicated as the axis X. In the example shown in the figures, the releasable engaging means consist of one or more suction cups 28, but persons skilled in the art will understand that it is also possible to use mechanical engaging means, such as grippers and feelers, for example.

In particular, the suction cups 28 consist of a hollow body 30 with a peripheral seal made of elastomer material, in fluid communication with an air suction circuit 32 for the creation of a vacuum.

The movement of the carriage 12 along the axis Z, the vertical movement of the slab support structure 13 along the columns 14 (axis Y), the extraction and subsequent retraction movement of the telescopic forks 20 associated with the platform 16 and the arms 21 of the pick-up device 18, as well as the movement of the pick-up device 18 towards/away from the platform along the axis X are performed by electrical actuating means, for example by respective electric gear motors 22, 24 and 26, all controlled by an electronic unit CU (not shown).

FIGS. 4a to 4f illustrate the method for making up a mixed pack of slab material consisting of at least two different types, performed using a displaceable lift truck 10 according to the invention.

Figures 4A, 4D:
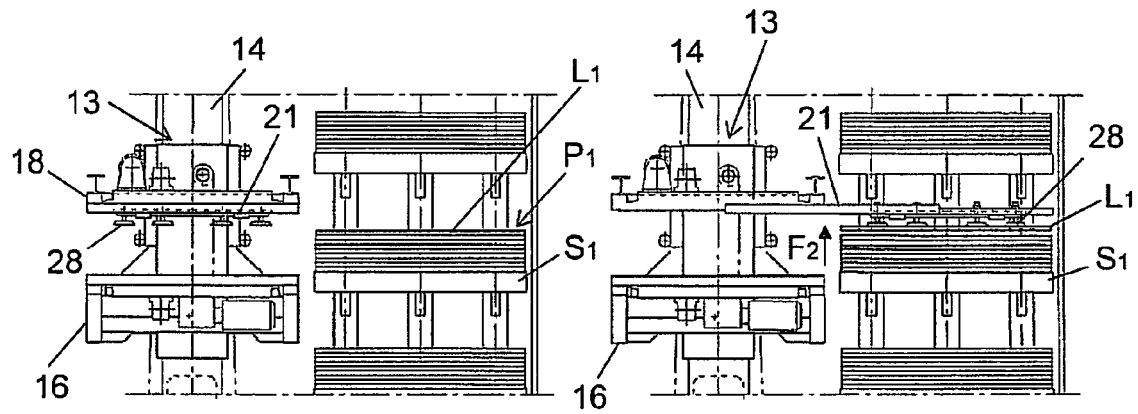

When the order is prepared and therefore several slabs of a different type are removed from the shelving so as to form a mixed pack PM, the displaceable lift truck 10 moves within the passageway C along the bottom rail 11 so as to be positioned opposite the desired shelving. The slab support structure 13 travels along the columns 14 until it reaches the height of a shelf $S_1$ on which a pack $P_1$ containing slabs $L_1$ of a first type is stored (FIG. 4a).

At this point, the arm 21 with suction cups 28 associated with the pick-up device 18 is extracted (FIG. 4b, arrow $F_1$), the pick-up device 18 is lowered so as to bring the suction cups 28 into contact with the top slab $L_1$ of the pack $P_1$ (FIG. 4c, arrow $F_2$) and the air suction circuit 32 is activated so as to create a vacuum in the region of the suction cups 28. In this way, the slab $L_1$ remains firmly gripped by the suction cups 28.

Figures 4B, 4E:
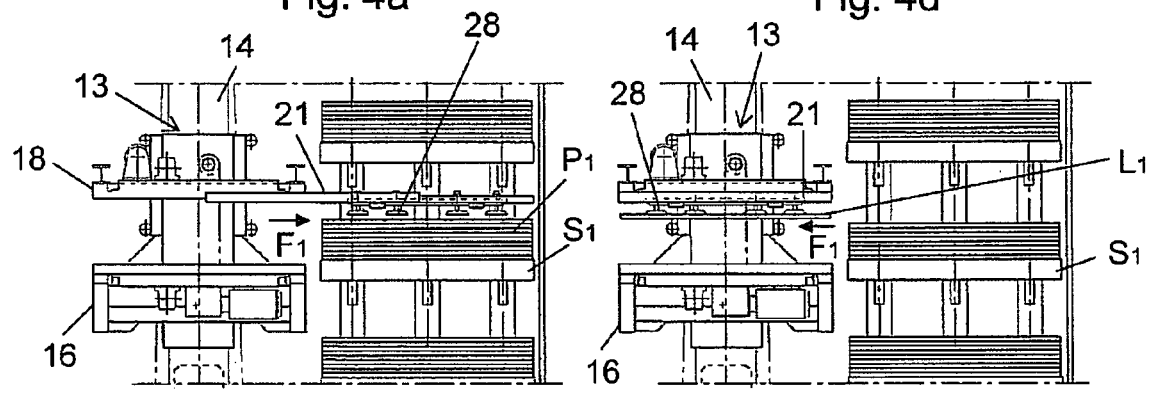
Figures 4C, 4F:
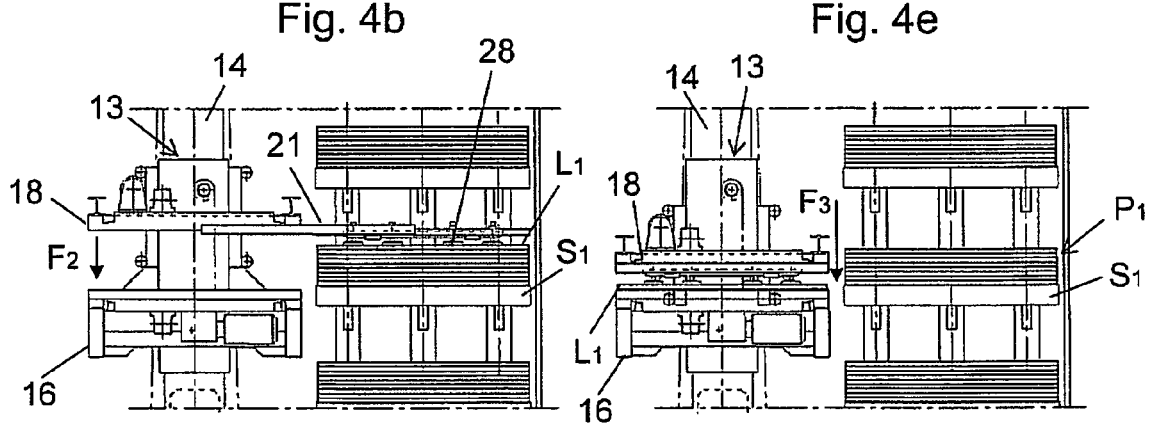

Then the pick-up device 18 is raised (FIG. 4d, arrow $F_2$) and the arm 21, together with the slab $L_1$ gripped by the suction cups 28, is retracted (FIG. 4e, arrow $F_2$). The pick-up device 18 moves further downwards (FIG. 4f, arrow $F_3$), so as to be positioned in the vicinity of the platform 16, following which the air suction circuit 32 is deactivated so as to release the slab $L_1$ from the suction cups 28 and position it on the platform 16.

The steps described above are repeated until, one at a time, the desired number of slabs $L_1$ is removed.

Then the displaceable lift truck 10 positions itself opposite another shelving, on a shelf $S_2$ of which a pack $P_2$ containing slabs $L_2$ of a second type is stored, and the desired number of slabs $L_2$ is then removed and stacked, one at a time, and so on, until the mixed pack PM ordered is assembled.

In the case of slabs made of particularly fragile material, firstly a sheet of material able to dampen any impacts is removed from a corresponding pack and then the slabs $L_1$, $L_2$, . . . , $L_n$ are positioned on this sheet in the manner described above, so as to prevent also any fragments of slab material from falling.

Once the operation involving deposition of the slabs $L_1$, $L_2$ . . . , $L_n$ onto the platform 16 has been performed and therefore the mixed pack PM to be despatched for completion of the order has been prepared, the pack PM is positioned, by means of extraction of the forks 20 associated with the platform 16, onto rollers 34 for conveying into a special loading area and subsequent loading onto a vehicle for despatch. Alternatively, the pack PM may be deposited in a temporary storage area, from where it will subsequently be removed for loading onto the vehicle and despatched.

On the other hand, when it is required to load the packs P of homogeneous slabs L in the store, the displaceable lift truck 10 operates in the manner of a conventional lift truck. In other words, the telescopic forks 20 associated with the platform 16 are extracted in order to remove a pack P of slabs and position it on the platform 16, the carriage 12 slides along the guides of the passageway C so as to be positioned opposite the desired shelf, the platform 16 slides along the columns 14 until it reaches the desired shelving S and the telescopic forks 20 are extracted again in order to position the pack on the shelf S.

From the above description it is clear how, by combining the slab removal step with the slab stacking and pack forming step, the picking area typically associated with a store of this type is eliminated, with a consequent saving of space.

Although the invention has been described with reference to a preferred example of embodiment thereof, persons skilled in the art will understand that it may be subject to numerous modifications and variations, all of which fall within the scope of protection defined by the accompanying claims.

The invention claimed is:

1. Displaceable lift truck for handling slab material, comprising:
   a carriage movable along a rail, at least one column which extends upwards from said movable carriage and a material support structure movable along said at least one column and comprising a bottom body or platform provided with extractable forks;
   wherein said material support structure includes a pick-up device comprising at least one extractable arm for retrieving slab material with releasable engaging means stemming from the at least one arm, and wherein the pick-up device is supported independent of the bottom body or platform and is selectively movable along a vertical axis relative to the bottom body or platform, the pick-up device adapted for being lowered along the vertical axis and enabling retrieved slab material to be brought in direct contact with the bottom body or platform for release of said material on said bottom body or platform via the releasable engaging means of the at least one arm; and wherein the extractable forks and the at least one arm are retractable inward relative to the bottom body or platform so as to collectively be in vertical alignment along with the bottom body or platform.

2. The displaceable lift truck according to claim 1, wherein said releasable engaging means comprise at least one suction cup.

3. The displaceable lift truck according to claim 2, wherein the at least one suction cup comprises a hollow body in fluid communication with a suction circuit.

4. The displaceable lift truck according to claim 3, wherein said hollow body is provided with a peripheral seal made of elastomer material.

5. The displaceable lift truck according to claim 1, wherein said releasable engaging means comprise mechanical engaging means.

6. The displaceable lift truck according to claim 1, wherein said pick-up device comprises means for performing lowering/raising with respect to the bottom body or platform.

7. The displaceable lift truck according to claim 1, wherein the pick-up device is movable between a first position wherein said pick-up device is opposite the slab material for picking up and removing said material, and a second position wherein said pick-up device is positioned over the bottom body or platform, the pick-up device being movable from the first position to the second position by being raised and by retracting the arm, together with the slab material gripped by the engaging means, and then by being moved downward so as to release the slab material directly on the bottom body or platform.

8. The displaceable lift truck according to claim 1, wherein the forks are extractable for further positioning of the slab material released onto the bottom body or platform via the pick-up device.

9. The displaceable lift truck according to claim 8, wherein the forks are extractable for further moving the released slab material from the bottom body or platform.

10. The displaceable lift truck according to claim 1, wherein when lowered along the vertical axis, the pick-up device is positionable directly over the bottom body or platform so as to release the slab material directly on the bottom body or platform via the at least one extractable arm.

11. Method for making up a mixed pack of slab material of at least two different types, characterized in that it comprises the steps of:
   (a) providing a displaceable lift truck according to claim 1;
   (b) positioning the material support structure opposite a shelf of shelving containing a pack of slabs of a selected type of the at least two different types;
   (c) positioning the pick-up device opposite a slab to be removed of the selected type;
   (d) activating the releasable engaging means of the at least one extractable arm of the pick-up device for picking up and removing the slab of the selected type;
   (e) positioning the pick-up device opposite the bottom body or platform;
   (f) positioning the slab of the selected type on the bottom body or platform;
   (g) repeating the steps (c) to (f) a number of times equal to the number of slabs of the selected type; and
   (h) repeating the steps (b) to (g) a number of times equal to the number of the at least two different types of slabs to be removed and stacked.

12. The method according to claim 11, wherein the step (c) comprises the steps of:
   (c1) extracting the at least one extractable arm from the material support structure; and
   (c2) lowering the pick-up device until the releasable engaging means come into contact with a slab of the selected type.

13. The method according to claim 11, wherein the step (e) comprises the steps of:
   (e1) raising the pick-up device with the slab of the selected type gripped by the releasable engaging means; and
   (e2) retracting at least one arm in the material support structure.

14. The method according to claim 11, further comprising, when stacking fragile material, before the step (c), removing from the pack a sheet of material able to dampen any impacts and prevent any fragments of slab material from falling, the sheet to be used for stacking the slabs thereon.

15. Displaceable lift truck for handling slab material, comprising:
   a carriage movable along a rail, at least one column which extends upwards from said movable carriage and a material support structure movable along said at least one column and comprising a bottom body or platform provided with extractable forks;
   wherein said material support structure includes a pick-up device comprising at least one extractable arm for retrieving slab material with releasable engaging means stemming from the at least one arm, and wherein the pick-up device is supported independent of the bottom body or platform and is selectively movable along a vertical axis relative to the bottom body or platform, the pick-up device adapted for being lowered along the vertical axis and enabling retrieved slab material to be brought in direct contact with the bottom body or platform for release of said material on the bottom body or platform, wherein the at least one extractable arm with the releasable engaging means is positionable directly over the bottom body or platform so as to release the retrieved slab material directly on the bottom body or platform; and
   wherein the extractable forks and the at least one arm are retractable inward relative to the bottom body or platform so as to collectively be in vertical alignment along with the bottom body or platform.

* * * * *